US012628210B2

(12) United States Patent
Huang et al.

(10) Patent No.: US 12,628,210 B2
(45) Date of Patent: May 12, 2026

(54) METHOD AND DEVICE FOR CONNECTING APPARATUSES, APPARATUS AND STORAGE MEDIUM

(71) Applicants: GUANGZHOU SHIYUAN ELECTRONICS CO., LTD., Guangzhou (CN); GUANGZHOU SHIRUI ELECTRONICS CO. LTD., Guangzhou (CN)

(72) Inventors: Jialiang Huang, Guangzhou (CN); Jingzhi Ye, Guangzhou (CN); Ling Huang, Guangzhou (CN); Jianlei Chen, Guangzhou (CN)

(73) Assignees: GUANGZHOU SHIYUAN ELECTRONICS CO., LTD., Guangzhou (CN); GUANGZHOU SHIRUI ELECTRONICS CO. LTD., Guangzhou (CN)

( * ) Notice: Subject to any disclaimer, the term of this patent is extended or adjusted under 35 U.S.C. 154(b) by 303 days.

(21) Appl. No.: 18/288,266

(22) PCT Filed: May 8, 2022

(86) PCT No.: PCT/CN2022/091585
§ 371 (c)(1),
(2) Date: Oct. 25, 2023

(87) PCT Pub. No.: WO2022/237704
PCT Pub. Date: Nov. 17, 2022

(65) Prior Publication Data
US 2024/0244677 A1 Jul. 18, 2024

(30) Foreign Application Priority Data
May 8, 2021 (CN) ......................... 202110500085.X

(51) Int. Cl.
*H04W 76/10* (2018.01)

(52) U.S. Cl.
CPC ................................... *H04W 76/10* (2018.02)

(58) Field of Classification Search
CPC ....... H04W 76/10; H04W 8/24; H04W 76/20; H04W 76/11
See application file for complete search history.

(56) References Cited

U.S. PATENT DOCUMENTS

| | | | |
|---|---|---|---|
| 2013/0177198 A1 | 7/2013 | Hogue et al. | |
| 2014/0087665 A1* | 3/2014 | Yang ..................... | H04W 8/005 455/41.2 |

(Continued)

FOREIGN PATENT DOCUMENTS

| | | |
|---|---|---|
| CN | 104010017 A | 8/2014 |
| CN | 105516183 A | 4/2016 |

(Continued)

OTHER PUBLICATIONS

Notice of Preliminary Rejection received for Korean Application No. 10-2023-7032244, dated Sep. 26, 2025.

(Continued)

*Primary Examiner* — Tuan H Nguyen
(74) *Attorney, Agent, or Firm* — Zhong Law, LLC

(57) ABSTRACT

Embodiments of the present disclosure discloses a method and a device for connecting apparatuses, apparatuses and storage medium, which relates to the field of communication. The method includes: determining whether the first apparatus stores an identifier of a target-type apparatus; when the first apparatus stores the identifier of the target-type apparatus, transmitting triggering information to a second apparatus, wherein the triggering information is used to trigger the second apparatus to transmit a connection request, a type associated with the second apparatus is the target type, and the second apparatus is connected with the first apparatus through a wired input line; receiving the connection request transmitted by the second apparatus; and (Continued)

establishing a wireless connection with the second apparatus based on the connection request. Therefore, the embodiments of the present disclosure can automatically connect apparatuses and improve an efficiency of connecting apparatuses.

18 Claims, 5 Drawing Sheets

(56) References Cited

U.S. PATENT DOCUMENTS

| | | | |
|---|---|---|---|
| 2015/0105014 A1 | 4/2015 | Kulavik et al. | |
| 2016/0057564 A1* | 2/2016 | Sim ........................ | H04W 4/80 |
| | | | 455/41.2 |

FOREIGN PATENT DOCUMENTS

| | | | |
|---|---|---|---|
| CN | 105577293 | A | 5/2016 |
| CN | 108702607 | A | 10/2018 |
| CN | 109274563 | A | 1/2019 |
| CN | 109587667 | A | 4/2019 |
| CN | 110072236 | A | 7/2019 |
| CN | 110944313 | A | 3/2020 |

OTHER PUBLICATIONS

International Search report and Written Opinion received for PCT Patent Application No. PCT/CN2022/091585, mailed on Jul. 27, 2022, 12 pages including English translation.

* cited by examiner line in analog audio

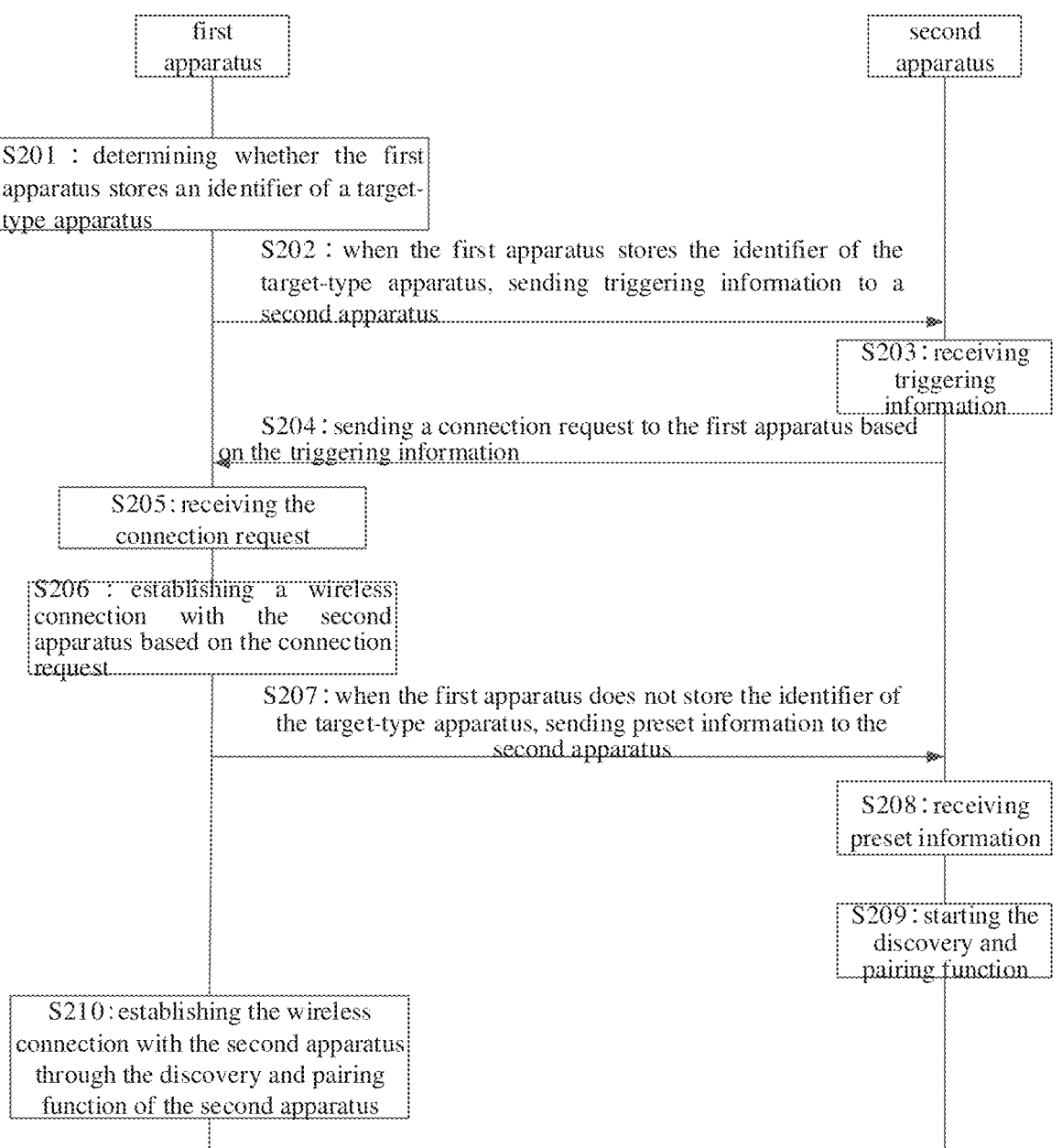

first apparatus second apparatus

S201 : determining whether the first apparatus stores an identifier of a target-type apparatus S202 : when the first apparatus stores the identifier of the target-type apparatus, sending triggering information to a second apparatus S203 : receiving triggering information S204 : sending a connection request to the first apparatus based on the triggering information S205 : receiving the connection request S206 : establishing a wireless connection with the second apparatus based on the connection request S207 : when the first apparatus does not store the identifier of the target-type apparatus, sending preset information to the second apparatus S208 : receiving preset information S209 : starting the discovery and pairing function S210 : establishing the wireless connection with the second apparatus through the discovery and pairing function of the second apparatus

Fig. 3 acquiring a storage list, wherein the storage list is used to store identifiers of apparatuses that have established wireless connections with the first apparatus —S401 when the type indicated by the identifier of the apparatus stored in the storage list is the target type, determining that the first apparatus stores the identifier of the target-type apparatus —S402 when the type indicated by the identifier of the apparatus stored in the storage list is not the target type, determining that the first apparatus does not store the identifier of the target-type apparatus —S403

Fig. 4

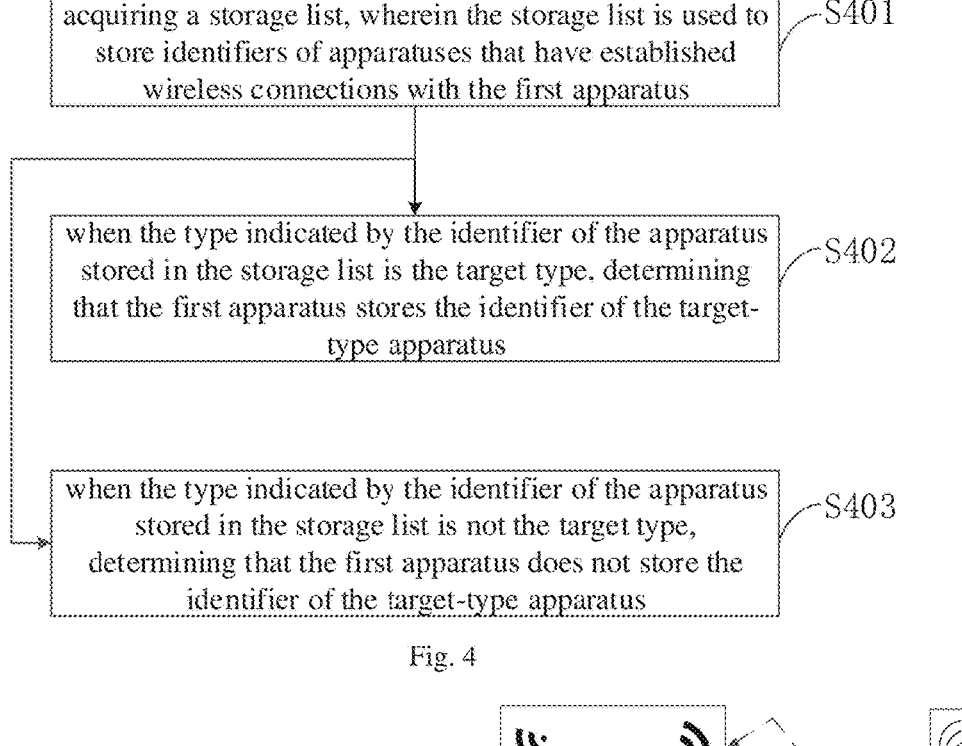

line in analog audio

Fig. 5

METHOD AND DEVICE FOR CONNECTING APPARATUSES, APPARATUS AND STORAGE MEDIUM

CROSS-REFERENCE TO RELATED APPLICATIONS

This application is the U.S. National Phase under 35. U.S.C. § 371 of International Application PCT/CN2022/091585, filed May 8, 2022, which claims priority to Chinese Patent Application No. 202110500085.X, filed May 8, 2021. The disclosures of the above described applications are hereby incorporated by reference in their entirety.

TECHNICAL FIELD

The present disclosure relates to the field of communication, and in particular to a method and device for connecting apparatuses, apparatus, and storage medium.

BACKGROUND

With the development of science and technology, there are more and more types of electronic apparatuses, each electronic apparatus has a certain function, and the interconnection of multiple electronic apparatuses can realize more functions.

At present, when multiple electronic apparatuses are interconnected, the multiple electronic apparatuses are manually installed and deployed, and then each electronic apparatus is adapted and connected. During the adaptation and connection process, each apparatus needs to manually find and configure relevant information.

However, if the number of electronic apparatuses is large, the adaptation and connection process can take a long time, resulting in low efficiency in connecting these apparatuses.

SUMMARY

Embodiments of the present disclosure provide a method and device for connecting apparatuses, apparatus, and storage medium, which can solve the problem of low efficiency in connecting apparatuses. The described technical solution includes the following aspects:

According to a first aspect of embodiments of the present disclosure, a method for connecting apparatuses is provided, which is applied to a first apparatus, including: determining whether the first apparatus stores an identifier of a target-type apparatus; when the first apparatus stores the identifier of the target-type apparatus, transmitting triggering information to a second apparatus, where the triggering information is used to trigger the second apparatus to transmit a connection request, a type associated with the second apparatus is the target type, and the second apparatus is connected with the first apparatus through a wired input line; receiving the connection request transmitted by the second apparatus; and establishing a wireless connection with the second apparatus based on the connection request.

According to a second aspect of embodiments of the present disclosure, a method for connecting apparatuses is provided, which is applied to a second apparatus, including: receiving triggering information transmitted by a first apparatus, where the triggering information is used to trigger the second apparatus to transmit a connection request; where the first apparatus is connected with the second apparatus through a wired input line; and transmitting a connection request to the first apparatus based on the triggering information.

According to a third aspect of embodiments of the present disclosure, a device for connecting apparatuses is provided, including: a determining module, configured to determine whether the first apparatus stores an identifier of a target-type apparatus; where the first apparatus is connected with a second apparatus through a wired input line; a first transmitting module, configured to: when the first apparatus stores the identifier of the target-type apparatus, transmit triggering information to the second apparatus, where the triggering information is used to trigger a second apparatus to transmit a connection request, a type associated with the second apparatus is the target type, and the second apparatus is connected with the first apparatus through the wired input line; a first receiving module, configured to receive the connection request transmitted by the second apparatus; and a connection module, configured to establish a wireless connection with the second apparatus based on the connection request.

According to a fourth aspect of embodiments of the present disclosure, a device for connecting apparatuses is provided, including: a second receiving module, configured to receive triggering information transmitted by a first apparatus, where the triggering information is used to trigger the second apparatus to transmit a connection request; the first apparatus is connected with a second apparatus through a wired input line; and a second transmitting module, configured to transmit a connection request to the first apparatus based on the triggering information.

According to a fifth aspect of embodiments of the present disclosure, a computer storage medium is provided, which stores a number of instructions. The instructions, when loaded and executed by a processor, perform the method in the above-mentioned first aspect.

According to a sixth aspect of embodiments of the present disclosure, a computer storage medium is provided, which stores a number of instructions. The instructions, when loaded and executed by a processor, perform the method in the above-mentioned second aspect.

According to a seventh aspect of embodiments of the present disclosure, an intelligent interactive board is provided, including a processor and a memory; where the memory stores a computer program, and the computer program, when loaded and executed by a processor, performs the method in the above-mentioned first aspect.

According to an eighth aspect of embodiments of the present disclosure, an electronic apparatus is provided, including a processor and a memory; where the memory stores a computer program, and the computer program, when loaded and executed by a processor, performs the method in the above-mentioned second aspect.

Embodiment of the present disclosure provides determining whether the first apparatus stores the identifier of the target-type apparatus; if the first apparatus stores the identifier of the target-type apparatus, transmitting triggering information to the second apparatus, wherein the triggering information is used to trigger a second apparatus to transmit a connection request, the type of the second apparatus is the target type, and the second apparatus is connected with the first apparatus through a wired input line; upon receiving the connection request from the second apparatus, establishing a wireless connection with the second apparatus based on the connection request. In this solution, the process begins by determining whether the first apparatus stores the identifier of the target-type apparatus is determined. If the first apparatus stores the identifier of the target-type apparatus, the second apparatus is triggered to transmit a connection request to the first apparatus request, so as to realize automatic reconnection with the second apparatus. The present disclosure solves the problem of requiring manual operation for connecting apparatuses, which causes low efficiency in connecting apparatuses and frequent occurrence of incorrect connections. The present disclosure achieves a technical effect of eliminating the steps of manual operation and realizing the automatic connection between the first apparatus and the second apparatus, thereby improving the efficiency in apparatus connection.

BRIEF DESCRIPTION OF THE DRAWINGS

To provide a clearer illustration of the technical solutions in the embodiments of the present disclosure or the current technology, the following description will briefly introduce the drawings that need to be used in the description of the embodiments or the current technology. The accompanying drawings in the following description are some embodiments of the present disclosure. Those skilled in the art may also acquire other drawings based on these drawings without creative work.

FIG. 3 is an interaction diagram 2 of a method for connecting apparatuses according to the embodiment of the present disclosure.

FIG. 4 is a flowchart of a method for connecting apparatuses according to an embodiment of the present disclosure.

FIG. 5 is a schematic diagram 2 of the application scenario of a method for connecting apparatuses applicable to the embodiment of the present disclosure.

DESCRIPTION OF THE PREFERRED EMBODIMENTS

To provide a clearer understanding of the purpose, technical solution and advantages of the present disclosure, the embodiments of the present disclosure will be further described in detail below in conjunction with the accompanying drawings.

It should be clear that the described embodiments are merely some of the embodiments of the present disclosure, not all of the embodiments. Based on the embodiments in the present disclosure, all other embodiments acquired by those skilled in the art without creative efforts fall within the protection scope of the present disclosure.

When the following description refers to the accompanying drawings, the same numerals in different drawings refer to the same or similar elements unless otherwise indicated. The implementations described in the following exemplary embodiments do not represent all implementations consistent with the present disclosure. Conversely, they are merely examples of apparatuses and methods consistent with aspects of the present disclosure as recited in the appended claims.

In the description of the present disclosure, it should be understood that the terms "first", "second", "third", etc. are merely used to distinguish similar objects, and are not necessarily used to describe a specific order or sequence, nor can be understood as indicating or implying relative importance. Those skilled in the art can understand the specific meanings of the above terms in the present disclosure according to optional situations. In addition, in the description of the present disclosure, unless otherwise specified, "plurality" means two or more. "And/or" describes an association relationship of associated objects, indicating that there may be three types of relationships. For example, A and/or B may indicate: A exists independently, A and B exist simultaneously, and B exists independently. The character "/" generally indicates that contextual objects are an "or" relationship.

Figure 1:
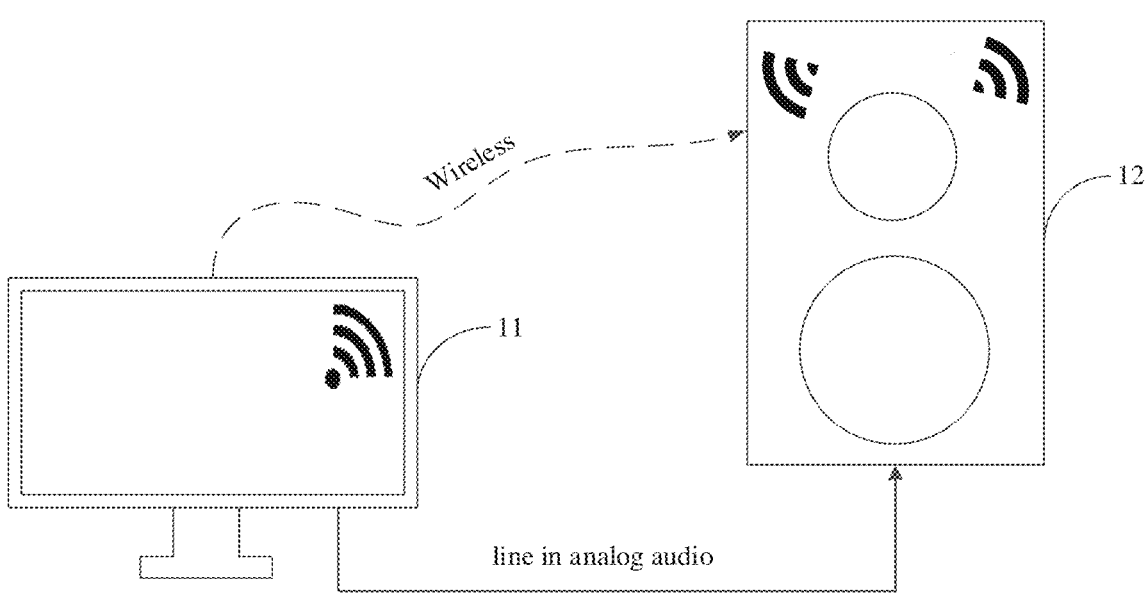
FIG. 1 is a schematic diagram 1 of an application scenario of a method for connecting apparatuses applicable to an embodiment of the present disclosure.

FIG. 1 is a schematic diagram 1 of an application scenario of a method for connecting apparatuses applicable to an embodiment of the present disclosure. As shown in FIG. 1, the present disclosure scenario includes: a first apparatus 11 and at least one second apparatus 12. The first apparatus 11 may be an intelligent terminal, Personal Computer (PC), and the second apparatus 12 may be an audio apparatus.

In some scenarios, the first apparatus 11 may also be an intelligent interactive board, and the second apparatus 12 may also be a loudspeaker box.

The hardware part of the intelligent interactive board is composed of a touch display module, an intelligent processing system (including a controller), etc., and is combined by the overall structural components and supported by specialized software systems. The touch displaying module includes a display screen, a touch component, and a backlight component. The backlight component is configured to provide a backlight source for the display screen. The display screen generally uses a liquid crystal display device for displaying images. The touch component is arranged on the display screen or arranged at the front end of the display screen, which is configured to collect touch operation data of a user, and transmit the collected touch operation data to an intelligent processing system for being processed.

In actual use, the display screen of the intelligent interactive board displays image data. When the user clicks on the content displayed on the display screen with a touch object such as a finger or a stylus, for example, clicking on a graphic button displayed on the display screen, the touch component of the intelligent interactive board collects the touch data. Subsequently, the touch component converts the touch data into the coordinate data of the touch point and transmits it to the intelligent processing system. Alternatively, the touch component may transmit it to the intelligent processing system, which further converts it into the coordinate data of the touch point. Once the intelligent processing system acquires the coordinate data of the touch point, the corresponding control operation is realized based on the preset program. The operation drives the display content to change, and realizes a variety of display and operation effects.

Touch components may be divided into six basic types based on technical principles: touch components of vector pressure sensing technology, touch components of resistive technology, touch components of capacitive technology, touch screens of electromagnetic technology, touch components of infrared technology, and touch components of surface acoustic wave technology. Based on the working principle of the touch component and the medium for transmitting information, the touch component may be divided into five types: resistive touch components, touch components of capacitive induction, touch components of electromagnetic induction, infrared touch components and touch components of surface acoustic wave.

When the user touches the display screen with a finger or a stylus, the touch component may collect the data of the touch point and transmit it to the intelligent processing system. The touch component may then implement different functional applications with the built-in software of the intelligent processing system, thereby realizing the touch controls of the intelligent processing system.

The "screen" and "big screen" mentioned in the present disclosure both refer to the display screen of the intelligent interactive board. The intelligent interactive board displaying a certain interface means that the display screen of the intelligent interactive board displaying the interface.

The intelligent interactive board is an integrated apparatus that controls the content displayed on the display panel (LCD, LED, PDP) and realizes human-computer interaction through touch technology. The intelligent interactive board may build a system together with a center console, camera, computer, speaker, microphone, and other apparatuses to achieve more functions.

Taking a teaching scene as an example, a teacher may teach through the intelligent interactive board. In addition, the teacher may also connect the intelligent interactive board with a loudspeaker box, microphones, and other teaching electronic apparatuses to achieve diversified teaching. There are a large number of teaching electronic apparatuses in a school classroom, and each apparatus is independent of each other. To realize interconnection between apparatuses, it is first necessary to deploy and install these apparatuses, and then connect these apparatuses. Taking these apparatuses connected via Bluetooth as an example, the operator needs to start the discovery and pairing function of each electronic apparatus in turn, so that other electronic apparatuses may be detected during the search. After other electronic apparatuses search and detect the surrounding electronic apparatuses, the operator needs to manually confirm the electronic apparatuses to be connected again. The above process is repeated several times to complete the adaptation and connection of each electronic apparatus. When there are a large number of apparatuses, during the adaptation and connection process, it is necessary to search and confirm the apparatuses one by one, resulting in low efficiency in connecting apparatuses. In addition, during the search process, the intelligent interactive board may search for multiple apparatuses around it. At this time, the apparatuses that the intelligent interactive board currently needs to connect to are manually screening out, and then manually connected. Thus, there may be a problem of misconnection.

In view of the above technical problems, the present disclosure proposes a following technical scheme: in some scenarios where the first apparatus is used, a type associated with the second apparatus that the first apparatus needs to connect to is usually a fixed type. The fixed type may be either a single type or multiple types. In each apparatus connection process, the first apparatus usually establishes a wireless connection with one type of second apparatus. Therefore, if the first apparatus stores the identifier of the second apparatus that has established a wireless connection with the first apparatus, the second apparatus can be automatically reconnected. To prevent a situation where the second apparatus enters a hidden state and proactive reconnection by the first apparatus results in repeated failed connections, the first apparatus may transmit triggering information to the second apparatus, so as to trigger the second apparatus to automatically reconnect with the first apparatus.

The technical solution of the present disclosure and how the technical solution solves the above-mentioned technical problems will be described in detail below, along with optional embodiments. The following optional embodiments may be combined with each other, and the same or similar concepts or processes may not be repeated in some embodiments. Embodiments of the present disclosure will be described below in conjunction with accompanying drawings.

Figure 2:
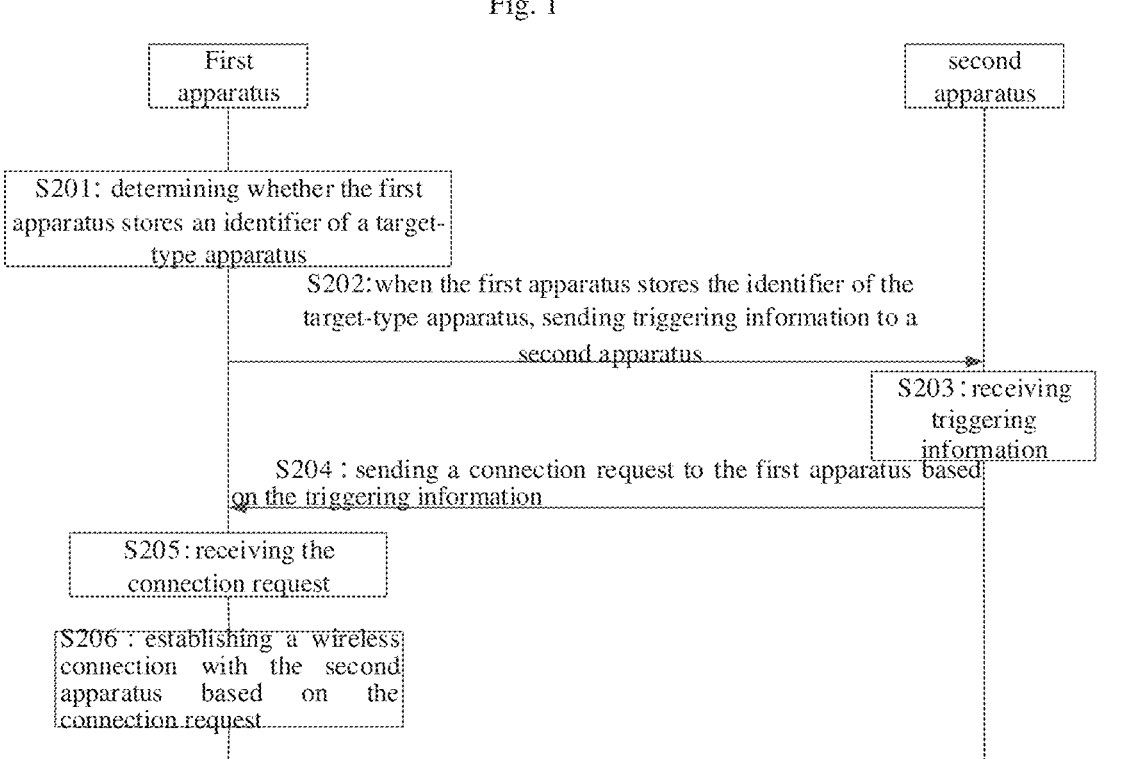
FIG. 2 is an interaction diagram 1 of a method for connecting apparatuses according to the embodiment of the present disclosure.

Based on the scenario shown in FIG. 1, FIG. 2 is an interaction diagram 1 of a method for connecting apparatuses according to the embodiment of the present disclosure. As shown in FIG. 2, a method for connecting apparatuses of this embodiment includes the following steps:

Step S201, determining whether the first apparatus stores an identifier of a target-type apparatus.

The executor of step S201 may be the first apparatus.

Taking the application of the intelligent interactive board in the teaching scene as an example, the target type of apparatus may be a loudspeaker box. For loudspeaker boxes that have established a wireless connection with the intelligent interactive board and loudspeaker boxes that have not established a connection with the intelligent interactive board, they all belong to the same target type of apparatus.

In this embodiment, the purpose of determining whether the first apparatus stores the identifier of a target-type apparatus is to determine whether the first apparatus has ever established a wireless connection with a target-type apparatus. If the first apparatus has established a wireless connection with a target-type apparatus, the first apparatus stores the identifier of the target-type apparatus. Based on the identifier of the apparatus stored in the first apparatus, it may be determined whether the first apparatus has ever established a wireless connection with a target-type apparatus.

Step S202, when the first apparatus stores the identifier of the target-type apparatus, transmitting, by the first apparatus, triggering information to a second apparatus, wherein the triggering information is used to trigger the second apparatus to transmit a connection request, a type associated with the second apparatus is the target type, and the second apparatus is connected with the first apparatus through a wired input line.

In this embodiment, the first apparatus and the second apparatus may transmit audio through a link, such as wired input line. The first apparatus and the second apparatus may also perform data transmission and communication through a low-power wireless communication technology. This embodiment aims at wirelessly connecting the first apparatus and the second apparatus.

In this embodiment, the second apparatus may be in a hidden state or may be in a discoverable state. Therefore, to prevent the second apparatus from being in a hidden state and the first apparatus transmitting a connection request that the second apparatus cannot receive, resulting in a fail connection, this embodiment establishes a physical link, such as a wired input line, between the second apparatus and the first apparatus. This way, if the second apparatus has not established a wireless connection with the first apparatus, the first apparatus may transmit triggering information to the second apparatus through the wired input line, so as to trigger the second apparatus to reconnect to the first apparatus.

In some implementations, the triggering information may be preset audio information. Taking the intelligent interactive board and the loudspeaker box as an example, the intelligent interactive board is provided with a line out interface, and the loudspeaker box is provided with a line in interface. Connecting the line out interface of the intelligent interactive board with the line in interface on the loudspeaker box through the wired input line may allow for the transmission of triggering information.

The second apparatus transmits a connection request to the first apparatus in a directed broadcast manner. Therefore, the function of the triggering information may be understood as triggering the directed broadcast function of the second apparatus, so that the second apparatus transmits a connection request to the first apparatus in the directed broadcast manner. For the optional implementation manner of directed broadcast, reference may be made to the description of related technologies, which will not be repeated in this embodiment.

Step S203, receiving, by the second apparatus, the triggering information.

Step S204, transmitting, by the second apparatus, a connection request to the first apparatus based on the triggering information.

The second apparatus transmits the connection request to the first apparatus in a directed broadcast manner.

Step S205, receiving, by the first apparatus, the connection request transmitted by the second apparatus.

Step S206, establishing, by the first apparatus, a wireless connection with the second apparatus based on the connection request.

In this embodiment, the connection request transmitted by the second apparatus includes the connection information of the second apparatus. Upon receiving the connection request from the second apparatus, the first apparatus establishes a connection with the first apparatus based on the connection information of the second apparatus in the connection request. The specific details of the connection information can be found in the relevant technical documentation, and they will not be reiterated here.

In some embodiments, after the first apparatus establishes a wireless connection with the second apparatus, the state of the second apparatus may be acquired, and the second apparatus may be controlled based on the state of the second apparatus.

The device connection method provided in this embodiment includes: determining whether the first apparatus stores the identifier of the target-type apparatus. If the first apparatus stores the identifier of the target-type apparatus, the triggering information is transmitted to the second apparatus through the wired input line, wherein the triggering information is used to trigger a second apparatus to transmit a connection request. The type of the second apparatus is the target type, and a wireless connection with the second apparatus is established based on the received connection request transmitted by the second apparatus. In this solution, it first determines whether the identifier of the target-type apparatus is stored in the first apparatus. If the first apparatus stores the identifier of the target-type apparatus, the second apparatus is triggered to transmit a connection request to the first apparatus, thereby realizing the reconnection with the second apparatus. The above-mentioned process does not require manual operation, enabling an automatic connection between the first apparatus and the second apparatus. Therefore, the connection efficiency can be improved. In addition, the second apparatus is connected with the first apparatus through a link, such as a wired input line, so that when the second apparatus has not established a wireless connection with the first apparatus, the first apparatus can transmit data to the second apparatus through the wired input line, so as to trigger the second apparatus to reconnect to the first apparatus. Therefore, prevented can be such a circumstance that when the second apparatus is in a hidden state, the first apparatus transmits a connection request to the second apparatus, but the second apparatus cannot receive it, resulting in a situation of failing in the connection.

FIG. 3 is an interaction diagram 2 of a method for connecting apparatuses according to the embodiment of the present disclosure. As shown in FIG. 3, a method for connecting apparatuses may also include the following steps:

Step S207, when the first apparatus does not store the identifier of the target-type apparatus, transmitting, by the first apparatus, preset information to the second apparatus, where the preset information is used to trigger the second apparatus to start a discovery and pairing function.

The preset information may be preset audio information. It should be understood that the triggering information and preset information are respectively used to trigger different functions of the second apparatus. To distinguish the triggering information from the preset information, the audio information corresponding to the triggering information and the preset information in this embodiment may be different.

In some embodiments, the first apparatus loads preset audio information and outputs it to the second apparatus through the line out interface. The second apparatus receives the preset audio information through the line in interface and recognizes whether the received audio information matches the preset audio information. If the received audio information matches the preset audio information, the second apparatus activates its own discovery and pairing function.

Step S208, receiving, by the second apparatus, preset information.

Step S209, starting, by the second apparatus, the discovery and pairing function.

Step S210, establishing, by the first apparatus, a wireless connection with the second apparatus through the discovery and pairing function of the second apparatus.

In this embodiment, the second apparatus receives the preset information, and starts its own discovery and pairing function. The discovery and pairing function is used to enable the first apparatus to discover the second apparatus and pair with the second apparatus to establish a wireless connection.

In particular, after the first apparatus transmits the preset information, it may start searching for a target-type apparatus. If a target-type apparatus is discovered, a wireless connection is established with the searched target-type apparatus.

In this embodiment, when the first apparatus does not store the identifier of the target-type apparatus, the first apparatus transmits preset information to the second apparatus to trigger the second apparatus to start the discovery and pairing function, and then establish a wireless connection with the second apparatus. In the situation where the first apparatus does not store the identifier of the target-type device, by transmitting the preset information to the second apparatus, it triggers the second apparatus to initiate its discovery and pairing function. Therefore, it is possible to achieve that the first apparatus can still automatically connect with the second apparatus when the first apparatus has not established a wireless connection with the target-type apparatus.

Based on the above-mentioned embodiments, to conveniently and quickly determine whether the first apparatus stores the identifier of the target-type apparatus, the first apparatus may also establish a storage list for storing identifiers of apparatuses that have established wireless connections with the first apparatus. Alternatively, after the first apparatus establishes a wireless connection with the second apparatus, the identifier of the currently connected second apparatus may be stored in the storage list. The form of the storage list may be shown in Table 1 as follows.

| Identifier of the connected apparatus |
| --- |
| SS*1 |
| SS*2 |
| . . . |

In the above Table 1, SS*1 and SS*2 are identifiers of the same type of apparatuses.

Similarly, in the second apparatus, a storage list may also be established for storing the identifiers of the apparatuses connected with the second apparatus, so as to realize automatic reconnection next time.

FIG. 4 is a flowchart of a method for connecting apparatuses according to an embodiment of the present disclosure. FIG. 4 shows a method for connecting apparatuses, the method including determining whether the first apparatus stores the identifier of the target-type apparatus optionally includes the following steps.

Step S401, acquiring a storage list, where the storage list is used to store identifiers of apparatuses that have established wireless connections with the first apparatus.

Step S402, when the type indicated by the identifier of the apparatus stored in the storage list is the target type, determining that the first apparatus stores the identifier of the target-type apparatus.

Step S403, when the type indicated by the identifier of the apparatus stored in the storage list is not the target type, determining that the first apparatus does not store the identifier of the target-type apparatus.

It can be understood that, at an initial stage, when the first apparatus has not established a wireless connection with any apparatus, the storage list is empty. In this case, the first apparatus may determine that the storage list is empty based on the storage list. Consequently, the first apparatus does not store the identifier of the target-type apparatus, indicating that the first apparatus has not established a wireless connection with the target-type apparatus. At this time, the method may be executed according to the implementation manner shown in Step S207 to Step S210. After Step S210 is performed, the first apparatus stores the identifier of the second apparatus in the storage list. Then, in the next connection between the first and second apparatuses, the automatic reconnection can be realized directly according to the implementation manner shown in step S202 to step S206.

For example, in a teaching scenario, the intelligent interactive board is commonly connected to the loudspeaker box. For the intelligent interactive board, the loudspeaker box is considered a type of apparatus, and all the loudspeakers are named based on the standard naming manner. For example, Loudspeaker box 1 is named "SS*1", and Loudspeaker box 2 is named "SS*2". It may be understood that although SS*1 and SS*2 belong to names of different loudspeaker boxes, the prefix "SS*" both indicate the name of the loudspeaker. Therefore, if the identifier of the apparatus in the storage list includes identifiers with the "SS*" prefix, it indicates that the loudspeaker box has established a wireless connection with the intelligent interactive board. Consequently, all subsequent loudspeakers can be automatically reconnected with the intelligent interactive board.

Based on realizing the automatic connection between the first apparatus and the second apparatus, to further ensure that the apparatus to be connected automatically is the intended apparatus, the present disclosure may also propose the following embodiment: After establishing a wireless connection with the first apparatus, the second apparatus sets its own state as a hidden state.

In the hidden state, other apparatuses cannot discover the second apparatus, so the first apparatus that needs to establish a wireless connection with the second apparatus may transmit triggering information to the second apparatus through the wired input line so as to trigger the second apparatus to actively reconnect with the first apparatus. As such, it may avoid the defect that the automatically connected apparatus is not the intended apparatus during the adaptation and connection process of the first apparatus. In addition, a plurality of second apparatuses will not affect each other when performing adaptive connections at the same time. For example, during the pairing process, Intelligent interactive board 1 is located in Classroom 1, and it will simultaneously search for both Loudspeaker 1 in Classroom 1 and Loudspeaker 2 in Classroom 2. Since Loudspeaker box 1 and Loudspeaker box 2 are in a discoverable state and are located very close to Intelligent Interactive Board 1, they can be detected simultaneously by the board. If the states of Loudspeaker box 1 and Loudspeaker box 2 are in a hidden state, Intelligent interactive board 1 will not detect them during the search. In such a case, Intelligent interactive board 1 is connected with Loudspeaker box 1 by a method for connecting apparatuses of the embodiment shown in FIG. 2, without being affected by other unpaired or paired apparatuses, thereby avoiding misconnection.

FIG. 5 is a schematic diagram 2 of the application scenario of a method for connecting apparatuses according to the embodiment of the present disclosure. As shown in FIG. 5, the application scenario includes: a first apparatus 51, at least one second apparatus 52 and at least one third apparatus 53; a third apparatus 53 may be connected with at least one second apparatus 52, and the third apparatus 53 and the second apparatus 52 are in a communication connection through high-real-time wireless communication technology, so as to realize low-latency wireless sound amplification function and data transmission communication. Optionally, the wireless communication technology with high real-time performance may adopt infrared communication technology.

The first apparatus 51 may be an intelligent terminal or a PC, the second apparatus 52 may be an audio device, and the third apparatus 53 may be a microphone.

The first apparatus 51 may be the first apparatus 11 illustrated in FIG. 1, and the second apparatus 52 may be the second apparatus 12 illustrated in FIG. 1. For the description of the first apparatus 51 and the second apparatus 52, reference may be made to the above-mentioned description of the first apparatus 11 and the second apparatus 12. This embodiment will not be described in detail herein.

In this embodiment, the first apparatus and the third apparatus are independent of each other, and there is no direct communication mode.

Based on the scenario shown in FIG. 5, a method for connecting apparatuses according to the embodiment of the present disclosure will be described in detail below.

Figure 6:
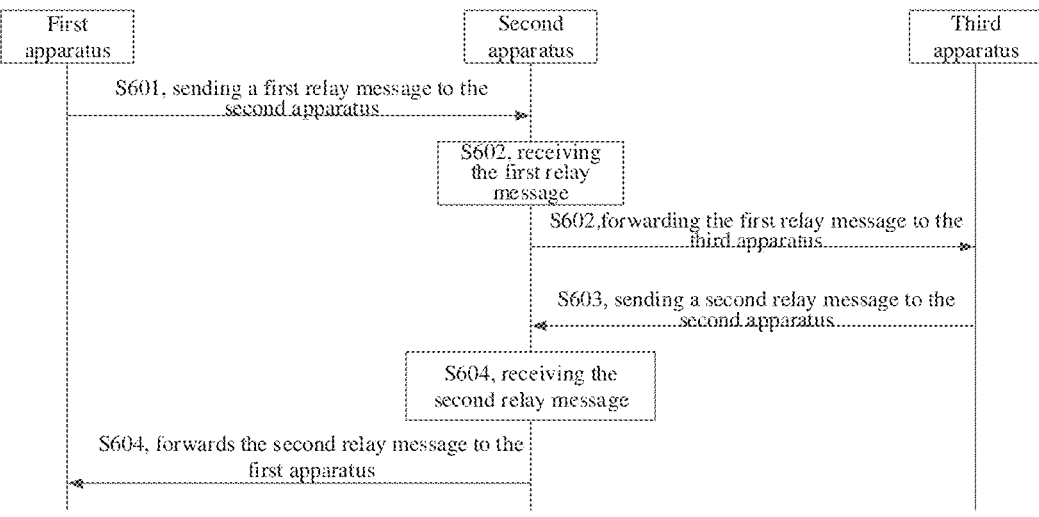
FIG. 6 is an interaction diagram 3 of a method for connecting apparatuses according to the embodiment of the present disclosure.

FIG. 6 is an interaction diagram 3 of a method for connecting apparatuses according to the embodiment of the present disclosure. As shown in FIG. 6, a method for connecting apparatuses of this embodiment includes the following steps:

Step S601, transmitting, by the first apparatus, a first relay message to the second apparatus;
    Step S602, receiving, by the second apparatus, the first relay message, and forwarding it to the third apparatus;
    Step S603, transmitting, by the third apparatus, a second relay message to the second apparatus;
    Step S604, receiving, by the second apparatus, the second relay message and forwarding it to the first apparatus.

Before performing the method of this embodiment, it is necessary to connect the second apparatus with the third apparatus.

In this embodiment, the first apparatus may communicate with the third apparatus through the second apparatus, enabling control over the third apparatus. In some embodiments, the first apparatus may query a status of the third apparatus through the second apparatus, enabling control over the third apparatus based on the result of the status query. It may be understood that the second apparatus serves as a message relay station between the first apparatus and the third apparatus.

The following are device embodiments of the present disclosure, which may be used to implement the method embodiments of the present disclosure. For details not disclosed in the device embodiments of the present disclosure, reference is made to the method embodiments of the present disclosure.

Figure 7:
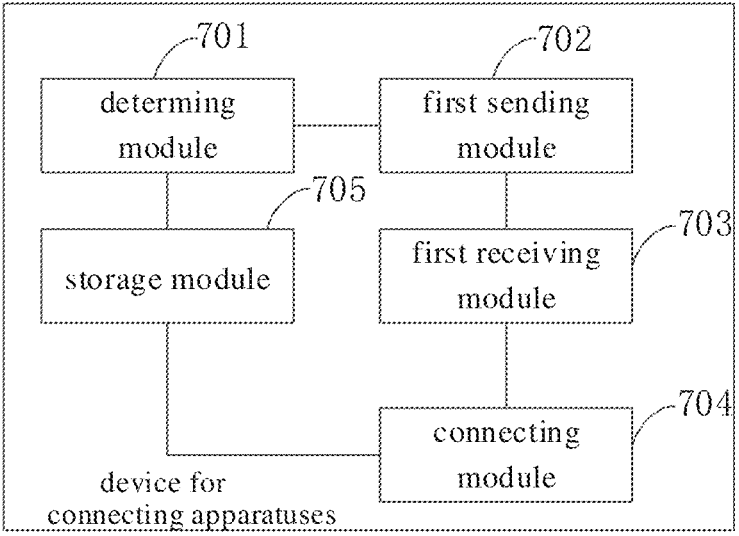
FIG. 7 is a schematic structural diagram of a device for connecting apparatuses according to an embodiment of the present disclosure.

Referring to FIG. 7, it shows a schematic structural diagram of a device for connecting apparatuses according to an embodiment of the present disclosure. The device for connecting apparatuses may be implemented as all or a part of the intelligent interactive board through software, hardware or a combination of the two. The device includes a determination module 701, a first transmitting module 702, a first receiving module 703 and a connecting module 704.

The determination module 701 is configured to determine whether the first apparatus stores an identifier of a target-type apparatus, where the first apparatus is connected with a second apparatus through a wired input line. The first transmitting module 702 is configured to: when the first apparatus stores the identifier of the target-type apparatus, transmit triggering information to the second apparatus, where the triggering information is used to trigger the second apparatus to transmit a connection request, a type associated with the second apparatus is the target type, and the second apparatus is connected with the first apparatus through a wired input line. The first receiving module 703 is configured to receive the connection request transmitted by the second apparatus. The connecting module 704 is configured to establish a wireless connection with the second apparatus based on the connection request.

Optionally, the first transmitting module 702 is further configured to: when the first apparatus does not store the identifier of the target-type apparatus, transmit preset information to the second apparatus, where the preset information is used to trigger the second apparatus to start discovery and pairing function. The connecting module is further configured to establish a wireless connection with the second apparatus through the discovery and pairing function of the second apparatus.

The determination module 701 is optionally configured to acquire a storage list, where the storage list is used to store identifiers of apparatuses that have established wireless connections with the first apparatus. If the type indicated by the identifier of the apparatus stored in the storage list is the target type, the determination module 701 determines that the first apparatus stores the identifier of the target-type apparatus. If the type indicated by the identifier of the apparatus stored in the storage list is not the target type, the determination module 701 determines that the first apparatus does not store the identifier of the target-type apparatus.

Further, the state of the second apparatus is a hidden state.

Optionally, the apparatus further includes: a storage module 705, which is configured to store the identifier of the currently connected second apparatus in the storage list.

Optionally, the first transmitting module 702 is further configured to: when the second apparatus is further connected with at least one third apparatus, transmit information to the third apparatus through the second apparatus. The first receiving module 703 is further configured to: when the second apparatus is further connected with at least one third apparatus, receive information of the third apparatus forwarded by the second apparatus.

Figure 8:
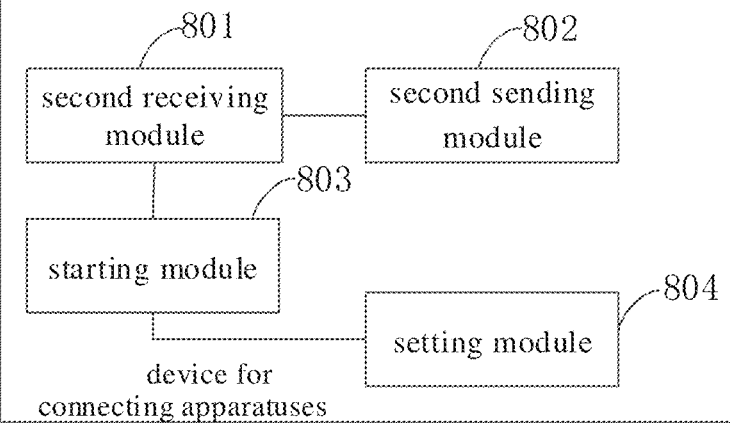
FIG. 8 is a schematic structural diagram of a device for connecting apparatuses according to an embodiment of the present disclosure.

Referring to FIG. 8, which shows a schematic structural diagram of a device for connecting apparatuses according to an embodiment of the present disclosure. The device for connecting apparatuses may be implemented as all or a part of the intelligent interactive board through software, hardware or a combination of the two. The device includes a second receiving module 801 and a second transmitting module 802.

The second receiving module 801 is configured to receive triggering information transmitted by the first apparatus, where the triggering information is used to trigger the second apparatus to transmit a connection request. The first apparatus is connected with the second apparatus through a wired input line. The second transmitting module 802 is configured to transmit a connection request to the first apparatus based on the triggering information.

Optionally, the apparatus further includes a starting module 803. The second receiving module 801 is further configured to receive preset information transmitted by the first apparatus, where the preset information is used to trigger the second apparatus to start a discovery and pairing function. The starting module 803 is further configured to start the discovery and pairing function based on the preset information.

Further, the device further includes a setting module 804, which is configured to set its own state as a hidden state.

Optionally, the second receiving module 801 is further configured to: when the second apparatus is further connected with at least one third apparatus, receive a message from the first apparatus and forward the message through the second transmitting module 802 to the third apparatus; and/or, receive a message from the third apparatus and forward the message to the first apparatus through the second transmitting module 802.

It should be noted that when the device for connecting apparatuses according to the above embodiment performs a method for connecting apparatuses, it uses the division of the above-mentioned functional modules as an example for illustration. In practical applications, the above-mentioned function allocation may be completed by different functional modules as needed. The internal structure of the apparatus may be divided into different functional modules to complete all or part of the functions described above. In addition, embodiments of the device for connecting apparatuses and a method for connecting apparatuses provided in the above embodiments belong to the same idea, and the implementation process thereof is detailed in the method embodiments and will not be repeated herein.

The serial numbers of the above embodiments mentioned in the present disclosure are for descriptive purposes and do not represent any ranking or preference among the embodiments.

In the device connecting apparatuses provided in this embodiment, it determines whether the first apparatus stores the identifier of the target-type apparatus. If the first apparatus has established a wireless connection with a target-type apparatus, the triggering information is transmitted to the second apparatus through the wired input line. The triggering information is used to trigger a second apparatus to transmit a connection request, a type associated with the second apparatus is the target type. A wireless connection with the second apparatus is established based on the received connection request transmitted by the second apparatus. In this solution, it firstly determines whether the first apparatus stores the identifier of the target-type apparatus. If the first apparatus had established a wireless connection with a target-type apparatus, the second apparatus is triggered to transmit a connection request to the first apparatus, thereby realizing the reconnection with the second apparatus. The above-mentioned process does not require manual operation, and can realize an automatic connection between the first apparatus and the second apparatus, therefore, the connection efficiency can be improved. In addition, the second apparatus is connected with the first apparatus through a link, such as a wired input line, so that when the second apparatus has not established a wireless connection with the first apparatus, the first apparatus can transmit data to the second apparatus through the wired input line, so as to trigger the second apparatus to reconnect to the first apparatus. Therefore, it may prevent such a situation that when the second apparatus is in a hidden state, the first apparatus transmits a connection request to the second apparatus, but the second apparatus cannot receive the connection request.

According to the embodiment of the present disclosure, a computer storage medium is further provided, which may store a plurality of instructions. The instructions are designed to be loaded and executed by a processor to perform the method in the embodiment shown in FIGS. 1-6, in which the first apparatus is an executor performing the method. For the optional execution process, reference is made to the optional description of the embodiments shown in FIGS. 1-6, and details are not repeated herein. The apparatus where the storage medium in this embodiment is located may be an intelligent interactive board.

According to the embodiment of the present disclosure, a computer storage medium is further provided, which may store a plurality of instructions. The instructions are designed to be loaded and executed by a processor to perform the method in the embodiment shown in FIGS. 1-6, in which the second apparatus is an executor performing the method. For the optional execution process, reference is made to the optional description of the embodiments shown in FIGS. 1-6, and details are not repeated herein. The apparatus where the storage medium in this embodiment is located may be a loudspeaker box.

Figure 9:
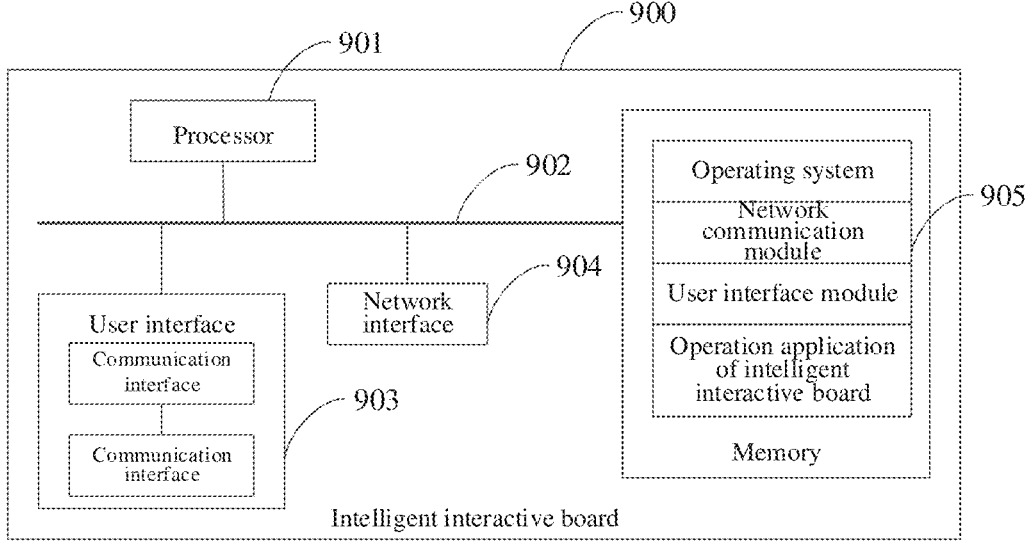
FIG. 9 is a schematic structural diagram of an intelligent interactive board according to an embodiment of the present disclosure.

Referring to FIG. 9, FIG. 9 provides a schematic structural diagram of an intelligent interactive board according to an embodiment of the present disclosure. As shown in FIG. 9, the intelligent interactive board 900 may include: at least one processor 901, at least one network interface 904, a user interface 903, a memory 905, and at least one communication bus 902.

The communication bus 902 is configured to realize connection and communication between these components.

The user interface 903 may include a display screen (Display) and a camera (Camera), and the optional user interface 903 may also include a standard wired interface and a wireless interface.

The network interface 904 may optionally include a standard wired interface and a wireless interface (e.g., a WI-FI interface).

The processor 901 may include one or more processing cores. The processor 901 uses various interfaces and lines to connect various parts in the entire intelligent interactive board 900. By running or executing instructions, programs, code sets or instruction sets stored in the memory 905 and calling data stored in the memory 905, various functions of the intelligent interactive board 900 and process data may be executed. Optionally, the processor 901 may implemented by adopting at least one hardware form of Digital Signal Processing (DSP), Field-Programmable Gate Array (FPGA), and Programmable Logic Array (PLA). The processor 1001 may integrate one or a combination of Central Processing Unit (CPU), an image processor (Graphics Processing Unit, GPU), a modem, and the like. CPU mainly handles the operating system, user interface and application programs, etc.; GPU is configured to render and draw the content that needs to be displayed on the display screen. The modem is configured to handle wireless communication. It may be understood that the above-mentioned modem may not be integrated into the processor 901 but may be implemented by using a single chip.

The memory 905 may include a Random Access Memory (RAM) or a Read-Only Memory. Optionally, the memory 905 includes a non-transitory computer-readable storage medium. The memory 905 may be configured to store instructions, programs, codes, sets of codes, or sets of instructions. The memory 905 may include a program storage area and a data storage area, the program storage area may store instructions for implementing an operating system, instructions for at least one function (such as a touch function, a sound playback function, an image playback function, etc.), instructions and the like for implementing the above method embodiments. The storage data area may store the data and the like involved in the above method embodiments. Optionally, the memory 905 may also be at least one storage device located away from the above-mentioned processor 901. As shown in FIG. 9, the memory 905, as a computer storage medium, may include an operating system, a network communication module, a user interface module, and an operating application program of an intelligent interactive board.

In the intelligent interactive board 900 shown in FIG. 9, the user interface 903 is mainly configured to provide the user with an input interface and obtain the data input by the user. The processor 901 may be configured to call the operation application of the intelligent interactive board stored in the memory 905 program, and alternatively execute the above steps of a method for connecting apparatuses applied to the first apparatus.

Figure 10:
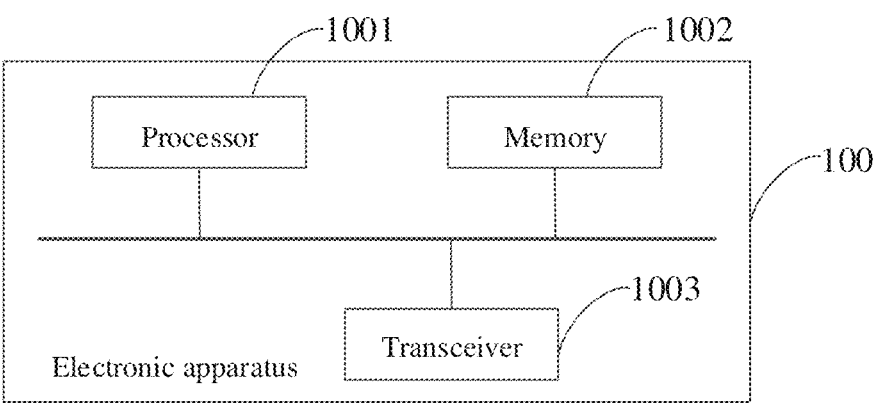
FIG. 10 is a schematic structural diagram of an electronic apparatus according to an embodiment of the present disclosure.

FIG. 10 is a schematic structural diagram of an electronic apparatus according to an embodiment of the present disclosure. As shown in FIG. 10, the electronic apparatus 100 may include: a processor 1001, a memory 1002 and a transceiver 1003.

The processor 1001 executes computer-executed instructions stored in the memory, so that the processor 1001 executes the solutions in the above-mentioned embodiments. The processor 1001 may be a general-purpose processor, including a central processing unit CPU, a network processor (NP), etc. The processor 1001 may also be a digital signal processor DSP, an application specific integrated circuit ASIC, a field programmable gate array FPGA, or other programmable logic components, discrete gate or transistor logic components, discrete hardware components.

The memory 1002 is connected with the processor 1001 through the system bus and communicates with each other, and the memory 1002 is used to store computer program instructions.

The transceiver 1003 may be configured to transmit messages to other apparatuses, or receive messages transmitted by other apparatuses.

The system bus may be a peripheral component interconnect standard (PCI) bus or an extended industry standard architecture (EISA) bus or the like. The system bus may be divided into address bus, data bus, control bus and the like. For ease of representation, one thick line is used in the figure, but it does not indicate that there is one bus or one type of bus. The transceivers are configured to enable communication between database access devices and other computers such as clients, read-write libraries, and read-only libraries. The memory may include random access memory (RAM) and non-volatile memory.

The electronic apparatus according to the embodiment of the present disclosure may be configured to implement the technical solution of a method for connecting apparatuses in the above embodiment, and its implementation principle and technical effect are similar, and will not be repeated herein.

Those skilled in the art should understand that the embodiments of the present disclosure may be provided as a method, a system, or a computer program product. Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (which may include disk storage, CD-ROM, optical storage, etc.) containing computer-usable program codes.

The present disclosure is described with reference to flowcharts and/or block diagrams of methods, devices (systems), and computer program products in embodiments of the present disclosure. It should be understood that each process and/or block in the flowchart and/or block diagram, and the combination of processes and/or blocks in the flowchart and/or block diagram may be implemented by computer program instructions. These computer program instructions may be provided to the processor of a general-purpose computer, a special-purpose computer, an embedded processor, or other programmable data processing equipment to generate a machine. Therefore, with the instructions executed by the processor of the computer or other programmable data processing equipment, a device that is configured to implement the functions specified in one process or multiple processes in the flowchart and/or one block or multiple blocks in the block diagram is generated.

These computer program instructions may also be stored in a computer-readable memory that may direct a computer or other programmable data processing equipment to work in a specific manner, so that the instructions stored in the computer-readable memory produce an article of manufacture including the instruction device. The instruction device implements the functions specified in one process or multiple processes in the flowchart and/or one block or multiple blocks in the block diagram.

These computer program instructions may also be loaded on a computer or other programmable data processing equipment, so that a series of operation steps are executed on the computer or other programmable equipment to produce computer-implemented processing, thus the instructions executed on the computer or other programmable equipment provide steps for implementing functions specified in a flow or multiple flows in the flowchart and/or a block or multiple blocks in the block diagram.

In a typical configuration, the computing device includes one or more processors (CPUs), input/output interfaces, network interfaces, and a memory.

The memory may include a non-permanent memory, a random-access memory (RAM) and/or a non-volatile memory, etc. in a computer-readable medium, such as read-only memory (ROM) or flash memory (flash RAM). The memory is an example of a computer-readable medium.

Computer-readable storage media include permanent and non-permanent, removable and non-removable media, and information storage may be achieved through any method or technology. The information may be computer-readable instructions, data structures, program modules, or other data. Examples of computer-readable storage media include, but are not limited to: phase change memory (PRAM), static random access memory (SRAM), dynamic random access memory (DRAM), other types of random access memory (RAM), read-only memory (ROM), electrically erasable programmable read-only memory (EEPROM), flash memory or other memories, compact disc read-only memory (CD-ROM), digital versatile disc (DVD) or other optical storage, magnetic cassette tape, magnetic disk storage or other magnetic storage devices or any other non-transmission media which may be configured to store information capable of being accessed by computing devices. According to the definition in the present disclosure, computer-readable media does not include transitory media, such as modulated data signals and carrier waves.

It should also be noted that the terms "include", "comprise" or any other variants thereof are intended to cover non-exclusive inclusion, so that a process, method, commodity or equipment including a series of elements not only includes those elements, but also includes other elements that are not explicitly listed, or also include elements inherent to such processes, methods, commodities, or equipment. If there are no more restrictions, the element defined by the sentence "including a . . . " does not exclude the existence of other identical elements in the process, method, commodity, or equipment that includes the element.

It should be noted that the above are merely embodiments of the present disclosure and the applied technical principle. Those skilled in the art will understand that the present disclosure is not limited to the specific embodiments described herein, and it is possible for those skilled in the art to make various obvious changes, re-adjustments, and substitutions without departing from the claimed scope of the present disclosure.

What is claimed is:

1. A method being performed by a first apparatus for connecting apparatuses, the method comprising:
   determining whether the first apparatus stores an identifier associated with a target-type apparatus;
   responsive to determining that the first apparatus stores the identifier of the target-type apparatus, transmitting triggering information to a second apparatus, wherein the triggering information is used to trigger the second apparatus to transmit a connection request, a type associated with the second apparatus is a target type, and the second apparatus is connected with the first apparatus by a wired line;
   receiving the connection request transmitted by the second apparatus; and
   establishing a wireless connection with the second apparatus based on the connection request.

2. The method of claim 1, further comprising:
   responsive to determining that the first apparatus does not store the identifier of the target-type apparatus, transmitting preset information to the second apparatus, wherein the preset information is used to trigger the second apparatus to start a discovery and pairing function; and
   establishing the wireless connection with the second apparatus by using the discovery and pairing function of the second apparatus.

3. The method of claim 1, wherein the determining whether the first apparatus stores the identifier of the target-type apparatus further comprises:
   acquiring a storage list, wherein the storage list is used to store identifiers of apparatuses that have established wireless connections with the first apparatus;
   responsive to determining that the type indicated by the identifier of an apparatus stored in the storage list is the target type, determining that the first apparatus stores the identifier of the target-type apparatus; and
   responsive to determining the type indicated by the identifier of the apparatus stored in the storage list is not the target type, determining that the first apparatus does not store the identifier of the target-type apparatus.

4. The method of claim 3, further comprising:
   storing the identifier of the currently connected second apparatus in the storage list.

5. The method of claim 1, wherein a state of the second apparatus is a hidden state.

6. The method of claim 1, further comprising:
   when the second apparatus is further connected with at least one third apparatus, communicating with the third apparatus through the second apparatus.

7. A method being performed by a second apparatus for connecting apparatuses, the method comprising:
   receiving triggering information transmitted by a first apparatus, wherein the triggering information is used to trigger the second apparatus to transmit a connection request, the first apparatus is connected with the second apparatus by a wired line; and
   transmitting the connection request to the first apparatus based on the triggering information.

8. The method of claim 7, further comprising:
   receiving preset information transmit by the first apparatus, wherein the preset information is used to trigger the second apparatus to start a discovery and pairing function; and
   starting the discovery and pairing function based on the preset information.

9. The method of claim 8, further comprising:
   setting a state of the second apparatus as a hidden state.

10. The method of claim 7, further comprising:
    responsive to determining that the second apparatus is further connected with at least one third apparatus, receiving a message from the first apparatus and forwarding the message to the third apparatus; and/or
    receiving a message from the third apparatus and forwarding the message to the first apparatus.

11. A device for connecting apparatuses, comprising:
    a determining module to determine whether the first apparatus stores an identifier associated with a target-type apparatus, wherein the first apparatus is connected with a second apparatus through a wired line;
    a first transmitting module to: responsive to determining that the first apparatus stores the identifier associated with the target-type apparatus, transmitting triggering information to the second apparatus, wherein the triggering information is used to trigger the second apparatus to transmit a connection request, a type associated with the second apparatus is a target type, and the second apparatus is connected with the first apparatus by a wired line;
    a first receiving module to receive the connection request transmitted by the second apparatus; and
    a connection module to establish a wireless connection with the second apparatus based on the connection request.

12. The device of claim 11, wherein
    the first transmitting module is further to: responsive to determining that the first apparatus does not store the identifier associated with the target-type apparatus, transmit preset information to the second apparatus, wherein the preset information is used to trigger the second apparatus to start discovery and pairing function;
    the connecting module is further to establish a wireless connection with the second apparatus through the discovery and pairing function of the second apparatus.

13. The device of claim 11, wherein a state of the second apparatus is a hidden state.

14. The device of claim 11, wherein
    the first transmitting module is further to: responsive to determining that the second apparatus is further connected with at least one third apparatus, transmit information to the third apparatus by using the second apparatus;
    the first receiving module is further to: responsive to determining that the second apparatus is further connected with at least one third apparatus, receive information of the third apparatus forwarded by the second apparatus.

15. A device for connecting apparatuses, comprising:
    a second receiving module to receive triggering information transmitted by a first apparatus, wherein the triggering information is used to trigger a second apparatus to transmit a connection request; the first apparatus is connected with the second apparatus by a wired line; and
    a second transmitting module to transmit the connection request to the first apparatus based on the triggering information.

16. The device of claim 15, further comprising:
    a starting module,
    wherein the second receiving module is further to receive preset information transmitted by the first apparatus, wherein the preset information is used to trigger the second apparatus to start a discovery and pairing function;

the starting module is further to start the discovery and pairing function based on the preset information.

17. The device of claim 16, further comprising:

a setting module to set a state of the second apparatus as a hidden state.

18. The device of claim 15, wherein the second receiving module is further configured to:

responsive to determining that the second apparatus is further connected with at least one third apparatus, receive a message from the first apparatus and forward the message to the third apparatus through the second transmitting module; and/or receive a message from the third apparatus and forward the message to the first apparatus through the second transmitting module.

\* \* \* \* \*